United States Patent
Kim et al.

(10) Patent No.: US 11,998,061 B2
(45) Date of Patent: Jun. 4, 2024

(54) AEROSOL GENERATING APPARATUS FOR CONTROLLING POWER OF HEATER AND OPERATION METHOD THEREOF

(71) Applicant: KT&G CORPORATION, Daejeon (KR)

(72) Inventors: Yong Hwan Kim, Gyeonggi-do (KR); Dong Sung Kim, Seoul (KR); Seung Won Lee, Gyeonggi-do (KR); Seok Su Jang, Daejeon (KR); Dae Nam Han, Seoul (KR)

(73) Assignee: KT&G CORPORATION, Daejeon (KR)

( * ) Notice: Subject to any disclaimer, the term of this patent is extended or adjusted under 35 U.S.C. 154(b) by 0 days.

(21) Appl. No.: 18/266,958

(22) PCT Filed: May 12, 2022

(86) PCT No.: PCT/KR2022/006825
§ 371 (c)(1),
(2) Date: Jun. 13, 2023

(87) PCT Pub. No.: WO2022/265230
PCT Pub. Date: Dec. 22, 2022

(65) Prior Publication Data
US 2024/0032606 A1    Feb. 1, 2024

(30) Foreign Application Priority Data

Jun. 15, 2021  (KR) .................. 10-2021-0077427

(51) Int. Cl.
*A24F 13/00*     (2006.01)
*A24F 40/465*    (2020.01)
(Continued)

(52) U.S. Cl.
CPC ............ *A24F 40/57* (2020.01); *A24F 40/465* (2020.01); *A24F 40/53* (2020.01)

(58) Field of Classification Search
CPC ..................................................... A24F 47/00
(Continued)

(56) References Cited

U.S. PATENT DOCUMENTS 5,760,577 A      6/1998   Shizuya
5,878,752 A *    3/1999   Adams ................. A24F 40/465
                                                            131/194

(Continued)

FOREIGN PATENT DOCUMENTS

CN        109414072 A    3/2019
CN        111031821 A    4/2020
(Continued)

OTHER PUBLICATIONS

Korean Office Action for KR 10-2022-0083491 dated Aug. 2, 2022.
(Continued)

*Primary Examiner* — Phuong K Dinh
(74) *Attorney, Agent, or Firm* — Sughrue Mion, PLLC (57) ABSTRACT

Provided is an aerosol generating apparatus including: a heater configured to heat an aerosol generating article inserted into an accommodation space of the aerosol generating apparatus; a sensing module including at least one of an inductive sensor configured to detect a change in an inductance of the accommodation space or a temperature sensor configured to detect a change in a temperature of the heater; and a processor configured to: detect, via the sensing module, whether the aerosol generating article that is inserted into the accommodation space is at least partially moved from the accommodation space; and based on detecting that the aerosol generating article is at least partially moved from the accommodation space, control a power (Continued)

supply to the heater, based on at least one of the change in the inductance or the change in the temperature acquired via the sensing module.

5 Claims, 5 Drawing Sheets

(51) Int. Cl.
*A24F 40/53* (2020.01)
*A24F 40/57* (2020.01)

(58) Field of Classification Search
USPC .................................................. 131/328–329
See application file for complete search history.

(56) References Cited

U.S. PATENT DOCUMENTS

| | | | |
|---|---|---|---|
| 9,717,277 B2 | 8/2017 | Mironov | |
| 11,793,241 B2* | 10/2023 | Lee | A24F 40/57 |
| 2019/0191780 A1 | 6/2019 | Wilke et al. | |
| 2020/0236999 A1 | 7/2020 | Mironov et al. | |
| 2020/0397054 A1 | 12/2020 | Riva Reggiori et al. | |
| 2021/0007393 A1 | 1/2021 | Jung et al. | |
| 2021/0007407 A1 | 1/2021 | Czapar et al. | |
| 2021/0093009 A1 | 4/2021 | Park et al. | |
| 2021/0112870 A1 | 4/2021 | Park et al. | |
| 2021/0127748 A1 | 5/2021 | Lim et al. | |
| 2022/0142249 A1 | 5/2022 | Lim et al. | |
| 2022/0295892 A1 | 9/2022 | Yoon et al. | |
| 2022/0418051 A1 | 12/2022 | Zinovik et al. | |

FOREIGN PATENT DOCUMENTS

| | | |
|---|---|---|
| CN | 111386054 A | 7/2020 |
| CN | 111511233 A | 8/2020 |
| CN | 111885932 A | 11/2020 |
| CN | 112822953 A | 5/2021 |
| JP | 2019-205405 A | 12/2019 |
| JP | 2020-516262 A | 6/2020 |
| KR | 10-0212176 B1 | 8/1999 |
| KR | 10-1648324 B1 | 8/2016 |
| KR | 10-1678335 B1 | 11/2016 |
| KR | 10-2019-0051745 A | 5/2019 |
| KR | 10-2019-0142594 A | 12/2019 |
| KR | 10-2020-0061233 A | 6/2020 |
| KR | 10-2020-0071403 A | 6/2020 |
| KR | 10-2231228 B1 | 3/2021 |
| WO | 2019/137235 A1 | 7/2019 |
| WO | 2021/037403 A1 | 3/2021 |

OTHER PUBLICATIONS

International Search Report for PCT/KR2022/006825 dated Sep. 22, 2022.
Written Opinion for PCT/KR2022/006825 dated Sep. 22, 2022.
Korean Office Action dated Aug. 1, 2023 in Korean Application No. 10-2021-0077427.
Chinese Office Action dated Jan. 13, 2024 in Application No. 202280007783.9.
Japanese Office Action dated Nov. 7, 2023 in Application No. 2023-535739.

* cited by examiner

AEROSOL GENERATING APPARATUS FOR CONTROLLING POWER OF HEATER AND OPERATION METHOD THEREOF

CROSS REFERENCE TO RELATED APPLICATIONS

This application is a National Stage of International Application No. PCT/KR2022/006825 filed May 12, 2022, claiming priority based on Korean Patent Application No. 10-2021-0077427 filed Jun. 15, 2021.

TECHNICAL FIELD

One or more example embodiments relate to an aerosol generating apparatus for controlling power of a heater by applying a preset hold time and an operation method thereof.

BACKGROUND ART

Recently, the demand for alternative methods to overcome the shortcomings of general cigarettes has increased. For example, there is an increasing demand for a system for generating aerosol by heating cigarettes or an aerosol generating material by using an aerosol generating apparatus, rather than by burning cigarettes.

Recently, a method of automatically controlling a heating operation of an aerosol generating apparatus has been researched. In particular, a smart off technology for automatically stopping a heating operation of an aerosol generating apparatus when a cigarette is removed has been developed.

DISCLOSURE OF INVENTION

Technical Problem

A method of automatically stopping a heating operation of a heater when a cigarette is removed from an aerosol generating apparatus has been introduced to increase the convenience of a user using the aerosol generating apparatus. However, even when a portion of the cigarette is moved unlike an intention of the user, a heating operation of the aerosol generating apparatus may automatically stop such that the user needs to start heating by turning on the power of the heater again, thereby needlessly increasing power consumption of the aerosol generating apparatus.

One or more embodiments include an aerosol generating apparatus for controlling power of a heater by applying a preset hold time and an operation method thereof.

Technical problems to be solved by one or more embodiments are not limited to the aforementioned problems, and unmentioned technical problems may be clearly understood by one of ordinary skill in the art to which the embodiments pertain from the description and accompanying drawings.

Solution to Problem

According to one or more embodiments, an aerosol generating apparatus includes: a heater configured to heat an aerosol generating article inserted into an accommodation space of the aerosol generating apparatus; a sensing module including at least one of an inductive sensor configured to detect a change in an inductance of the accommodation space or a temperature sensor configured to detect a change in a temperature of the heater; and a processor configured to: detect, via the sensing module, whether the aerosol generating article that is inserted into the accommodation space is at least partially moved from the accommodation space; and based on detecting that the aerosol generating article is at least partially moved from the accommodation space, control a power supply to the heater, based on at least one of the change in the inductance or the change in the temperature acquired via the sensing module.

According to one or more embodiments, an operation method of an aerosol generating apparatus, includes: detecting, via a sensing module, whether an aerosol generating article that is inserted into an accommodation space is at least partially moved from the accommodation space; and based on detecting that the aerosol generating article is at least partially moved from the accommodation space, controlling a power supply to a heater, based on at least one of a change in an inductance or a change in a temperature detected via the sensing module.

Advantageous Effects of Invention

According to one or more example embodiments, a hold time may be applied to determine whether an aerosol generating article is moved in an aerosol generating apparatus. Therefore, a user may efficiently control power of a heater by reflecting an intention, and prevent waste of power consumption that may occur due to frequent control of power.

BEST MODE FOR CARRYING OUT THE INVENTION

With respect to the terms used to describe in the various embodiments, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

In the disclosure, "at least one" means one or more, and "a plurality of" means two or more. "At least one of the following items" or a similar expression means any combination of these items, including a single item or any combination of a plurality of items. For example, "at least one of a and b" may represent a alone, b alone, or "a and b".

As used herein, an aerosol generating apparatus may be an apparatus which generates aerosol by using an aerosol generating material to generate aerosol that may be directly inhaled into a user's lungs through the user's mouth. For example, the aerosol generating apparatus may be a holder.

As used herein, the term "puff" may refer to the user's inhalation, and the inhalation may refer to a situation in which smoke is drawn into the user's oral cavity, nasal cavity, or lungs through the user's mouth or nose.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

Figure 1:
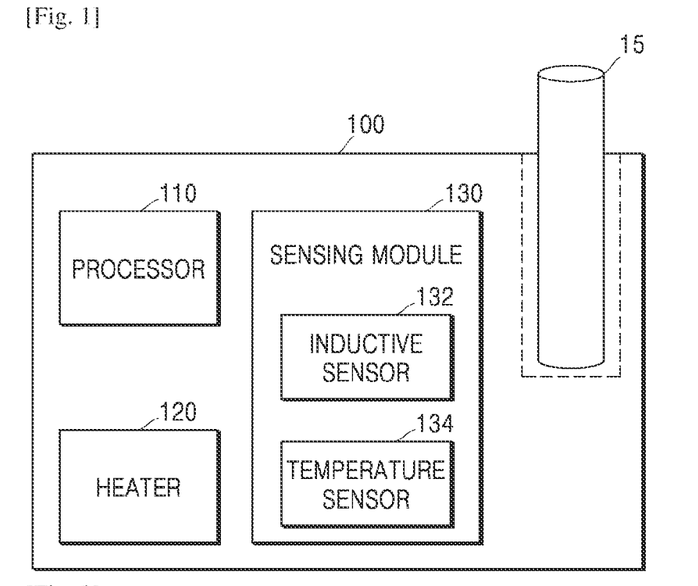
FIG. 1 illustrates a block diagram of an aerosol generating system according to an embodiment.

FIG. 1 illustrates a block diagram of an aerosol generating system according to an embodiment.

Referring to FIG. 1, an aerosol generating system may include an aerosol generating apparatus 100 and an aerosol generating article 15. In an embodiment, the aerosol generating apparatus 100 may include an accommodation space into which the aerosol generating article 15 may be inserted. For example, the aerosol generating apparatus 100 may generate aerosol by heating the aerosol generating article 15 inserted in the accommodation space. The aerosol generating article 15 may correspond to a cigarette, but is not limited thereto. The aerosol generating article 15 may include all articles including an aerosol generating material.

In an embodiment, the aerosol generating apparatus 100 may include a processor 110, a heater 120, and a sensing module 130. However, the configuration of the aerosol generating apparatus 100 is not limited to that shown in FIG. 1. It will be understood by one of ordinary skill in the art pertaining to the disclosure that according to the design of the aerosol generating apparatus 100, some of components shown in FIG. 1 may be omitted, or an additional component may be further included.

In an embodiment, the heater 120 may heat the aerosol generating article 15 inserted into the accommodation space of the aerosol generating apparatus 100.

For example, the heater 120 may be an induction heating-type heater. In detail, the heater 120 may include an induction coil for heating the aerosol generating article 15 in an induction heating method and a susceptor that may be heated by passing therethrough a variable magnetic field generated by the induction coil.

For another example, the heater 120 may be an electro-resistive heater. In detail, the heater 120 may include an electrically conductive track, and may be heated as a current flows through the electrically conductive track. However, the heater 120 is not limited to the above-described example, and may include any type of heaters which may be heated to a wanted temperature. Here, the wanted temperature may be preset in the aerosol generating apparatus 100, or may be set to a temperature wanted by a user.

In an embodiment, the sensing module 130 may include at least one of an inductive sensor 132 and a temperature sensor 134. For example, the inductive sensor 132 may detect whether the aerosol generating article 15 is removed from, at least partially moved from, or inserted into the accommodation space of the aerosol generating apparatus 100. The inductive sensor 132 may detect a change in inductance of the accommodation space occurring as the aerosol generating article 15 is removed from, at least partially moved from, or inserted into the accommodation space. Here, the aerosol generating article 15 may include a metal material such as aluminum. For example, the temperature sensor 134 may detect whether the aerosol generating article 15 is removed from, at least partially moved from, or inserted into the accommodation space of the aerosol generating apparatus 100. The temperature sensor 134 may detect a change in temperature occurring as the aerosol generating article 15 is removed from, at least partially moved from, or inserted into the accommodation space.

In an embodiment, upon determining whether the aerosol generating article 15 is moved from the accommodation space of the aerosol generating apparatus 100, the processor 110 may start counting of a designated time. For example, the designated time may refer to a waiting time for determining whether the aerosol generating article 15 is reinserted from a point in time when the aerosol generating article 15 is moved. The designated time may be set to a different value according to a manufacturer's design, user setting, and the like.

In an embodiment, the processor 110 may detect the change in inductance via the inductive sensor 132 during the designated time. For example, the processor 110 may detect the change in inductance within 5 seconds from the point in time when the aerosol generating article 15 is moved. Here, the processor 110 may detect, within 5 seconds from the point in time when the aerosol generating article 15 is moved, whether a change in inductance occurs due to a reinsertion of the aerosol generating article 15. In an embodiment, the processor 110 may determine whether to supply power to the heater 120, based on the detected change in inductance.

In an embodiment, the processor 110 may be hardware that controls overall operation of the aerosol generating apparatus 100. For example, the processor 110 may control operations of the other elements included in the aerosol generating apparatus 100 as well as operations of the heater 120 and the sensing module 130. In an embodiment, the processor 110 may also determine whether the aerosol generating apparatus 100 is in an operable state by checking a state of each of the elements of the aerosol generating apparatus 100.

Figure 2:
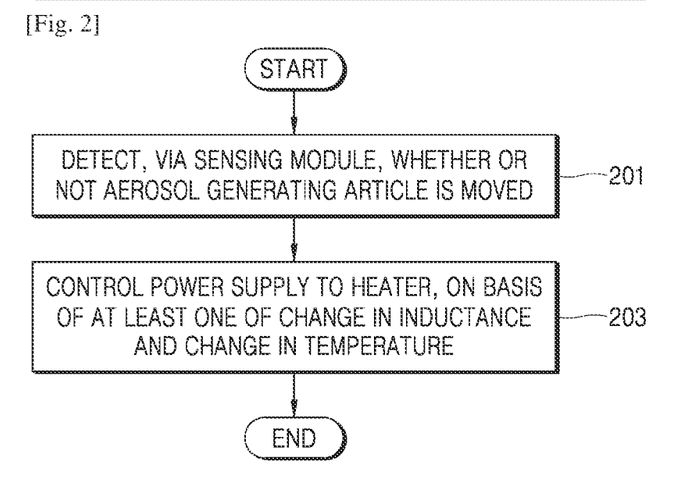
FIG. 2 illustrates a flowchart of controlling a power supply to a heater in the aerosol generating system of FIG. 1.

FIG. 2 illustrates a flowchart of controlling a power supply to a heater in the aerosol generating system of FIG. 1.

Referring to FIG. 2, in operation 201, a processor (e.g., the processor 110 of FIG. 1) may detect, via a sensing module (e.g., the sensing module 130 of FIG. 1), whether an aerosol generating article (e.g., the aerosol generating article 15 of FIG. 1), while being inserted into an accommodation space of an aerosol generating apparatus (e.g., the aerosol generating apparatus 100 of FIG. 1), is moved from the accommodation space.

In an embodiment, the processor 110 may detect whether the aerosol generating article 15 is moved from the accommodation space of the aerosol generating apparatus 100 by detecting a change in inductance via an inductive sensor (e.g., the inductive sensor 132 of FIG. 1). For example, the aerosol generating article 15 inserted into and located in the accommodation space of the aerosol generating apparatus 100 may include a metal material. A magnetic field may be generated on a surface of the inductive sensor 132. When a metal material (or a magnetic substance) located within the magnetic field generated by the inductive sensor 132 is moved, the processor 110 may detect, via the inductive sensor 132, that a value of inductance is changed due to the movement of the metal material. When the changed value in inductance is greater than a threshold value, the processor 110 may detect that the aerosol generating article 15 is moved from the accommodation space of the aerosol generating apparatus 100.

In another embodiment, the processor 110 may detect whether the aerosol generating article 15 is moved from the accommodation space of the aerosol generating apparatus 100 by detecting a change in temperature via a temperature sensor (e.g., the temperature sensor 134 of FIG. 1). For example, when the aerosol generating article 15 inserted into and located in the accommodation space of the aerosol generating apparatus 100 is moved, the temperature sensor 134 may detect that an internal temperature of the aerosol generating apparatus 100 increases rapidly. When the increased internal temperature is higher than a threshold temperature, the processor 110 may also detect that the aerosol generating article 15 is moved from the accommodation space of the aerosol generating apparatus 100.

According to an embodiment, in operation 203, the processor 110 may control a power supply to the heater 120, based on at least one of the change in inductance and the change in temperature.

In an embodiment, when a magnitude of a change in inductance detected during a designated time is less than the threshold value, the processor 110 may stop the power supply to the heater 120. For example, when the designated time is 5 seconds and a magnitude of a change in inductance detected during 5 seconds is less than the threshold value, the processor 110 may stop the power supply to the heater 120 by determining that the aerosol generating article 15 is not reinserted. Here, stopping the power supply to the heater 120 may indicate that smoking by a user is terminated.

In another embodiment, when the magnitude of the change in inductance detected during the designated time is greater than or equal to the threshold value, the processor 110 may maintain the power supply to the heater 120. For example, when the designated time is 5 seconds and the magnitude of the change in inductance detected during 5 seconds is greater than or equal to the threshold value, the processor 110 may maintain the power supply to the heater 120 by determining that the aerosol generating article 15 is reinserted.

In an embodiment, the aerosol generating apparatus 100 may reduce consumption of power by determining whether the power supply to the heater 120 is performed, based on the change in inductance detected during the designated time. For example, an existing aerosol generating apparatus may stop heating by automatically turning off power of a heater at a point in time when an aerosol generating article is removed. However, even when the aerosol generating article is mistakenly moved from the aerosol generating apparatus unlike a user's intention (e.g., even when the aerosol generating article sticks to the user's lips and comes out of the aerosol generating apparatus), the aerosol generating apparatus may stop heating by automatically turning off the power of the heater. In this case, the user needs to start heating by turning on the power of the heater again. Accordingly, the existing aerosol generating apparatus may be inconvenient to use, waste power due to frequent control of power, and the like. When detecting that the aerosol generating article 15 is moved and not reinserted based on detecting the change in inductance during the designated time, the aerosol generating apparatus 100 according to the embodiment may stop heating by turning off the power of the heater 120, thereby solving drawbacks that may occur in the related art.

In an embodiment, the processor 110 may control the power supply to the heater 120, based on a magnitude of a change in temperature detected during the designated time. For example, when the designated time is 5 seconds and the magnitude of the change in temperature detected during 5 seconds is less than a threshold value, the processor 110 may stop the power supply to the heater 120 by determining that the aerosol generating article 15 is not reinserted. Here, stopping the power supply to the heater 120 may indicate that smoking by the user is terminated. For another example, when the designated time is 5 seconds and the magnitude of the change in temperature detected during 5 seconds is greater than or equal to the threshold value, the processor 110 may maintain the power supply to the heater 120 by determining that the aerosol generating article 15 is reinserted.

In other words, as the aerosol generating article 15 is reinserted, a temperature of the heater 120 may decrease, and the processor 110 may control the power supply to the heater 120 by comparing the degree of decrease in the temperature of the heater 120 with a preset threshold value.

Figure 3:
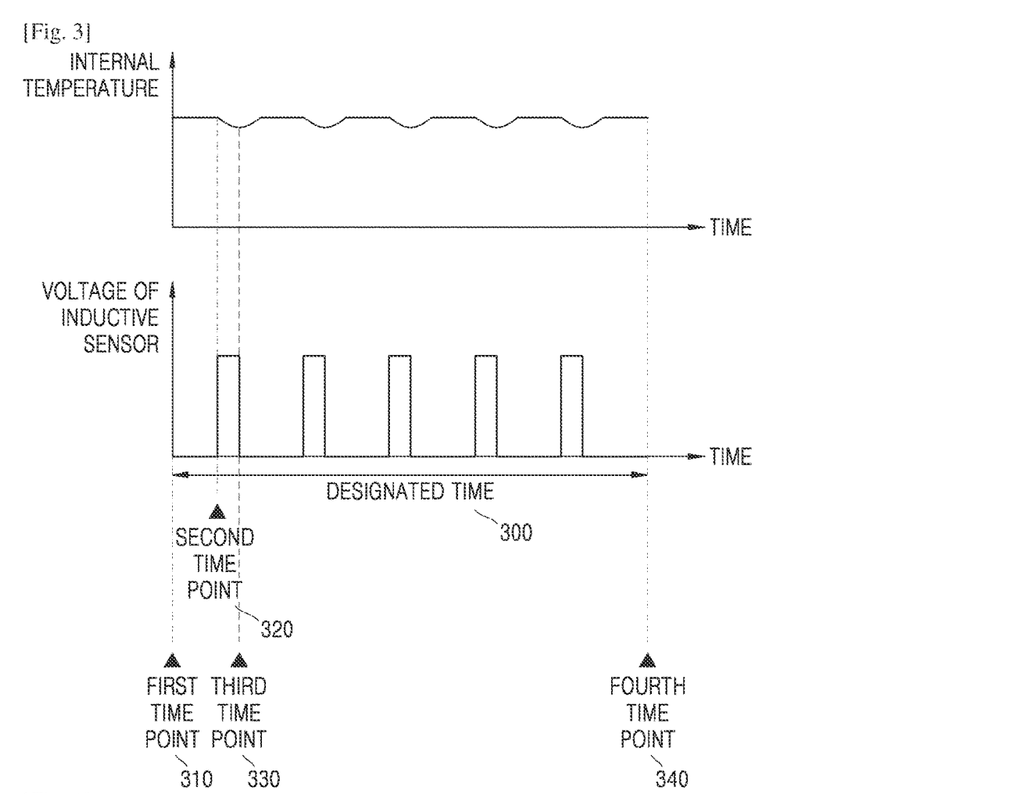
FIG. 3 illustrates graphs for explaining a method of controlling an inductive sensor of an aerosol generating apparatus, according to an embodiment.

FIG. 3 illustrates graphs for explaining a method of controlling an inductive sensor of an aerosol generating apparatus, according to an embodiment.

Referring to FIG. 3, a processor (e.g., the processor 110 of FIG. 1) may detect, via an inductive sensor (e.g., the inductive sensor 132 of FIG. 1), a change in inductance during a designated time 300. For example, the processor 110 may detect the change in inductance by controlling a voltage of the inductive sensor 132 in a pulse width modulation (PWM) method. Here, the processor 110 may preset the number of times the inductive sensor 132 is switched to an activation state during the designated time 300. FIG. 3 illustrates that the inductive sensor 132 is switched to the activation state five times during the designated time 300, but the number of times the inductive sensor 132 is switched to the activation state is not limited thereto.

In an embodiment, the processor 110 may determine that an aerosol generating article (e.g., the aerosol generating article 15 of FIG. 1) is moved from an accommodation space of an aerosol generating apparatus (e.g., the aerosol generating apparatus 100 of FIG. 1) at a first time point 310. The first time point 310 may refer to a point in time when counting of the designated time 300 starts.

In an embodiment, the processor 110 may switch a state of the inductive sensor 132 to an activation state by controlling a supply voltage to the inductive sensor 132 at a second time point 320. Here, the processor 110 may cut off, at the second time point 320, power supplied from a battery to a heater (e.g., the heater 120 of FIG. 1). In other words, the processor 110 may perform in parallel an operation of cutting off the power supplied to the heater 120 and an operation of switching the state of the inductive sensor 132 to the activation state. In an embodiment, as the power supplied to the heater 120 is cut off at the second time point 320, an internal temperature of the aerosol generating apparatus 100 may decrease. A value of inductance detected by the inductive sensor 132 may be distorted at a high temperature, and thus, the processor 110 may periodically stop heating of the heater 120 and detect the change in inductance via the inductive sensor 132.

In an embodiment, the processor 110 may switch the state of the inductive sensor 132 to an inactivation state at a third time point 330. Here, the processor 110 may control power to be supplied from the battery to the heater 120 at the third time point 330. In other words, the processor 110 may perform in parallel an operation of supplying the power to the heater 120 and an operation of switching the state of the inductive sensor 132 to the inactivation state. In an embodiment, as the power is supplied to the heater 120 at the third time point 330, the internal temperature of the aerosol generating apparatus 100 may increase.

In an embodiment, the processor 110 may detect, via the inductive sensor 132, the change in inductance at least one time (e.g., five times) from the first time point 310 to a fourth time point 340. The processor 110 may determine whether the aerosol generating article 15 is reinserted, based on the change in inductance detected during the designated time 300 from the first time point 310 to the fourth time point 340. For example, when the change in inductance detected during the designated time 300 from the first time point 310 to the fourth time point 340 is less than a threshold value, the processor 110 may determine that the aerosol generating article 15 is not reinserted, and, when the change in inductance is greater than or equal to the threshold value, may determine that the aerosol generating article 15 is reinserted.

FIG. 3 illustrates only a time point after the aerosol generating article 15 is moved from the accommodation space of the aerosol generating apparatus 100, but is not limited thereto. In another embodiment, the method of controlling the voltage of the inductive sensor 132 and the method of controlling power with respect to the heater 120, which are described above with reference to FIG. 3, may be equally applied in a method of determining whether the aerosol generating article 15 is moved from the accommodation space of the aerosol generating apparatus 100.

Figure 4:
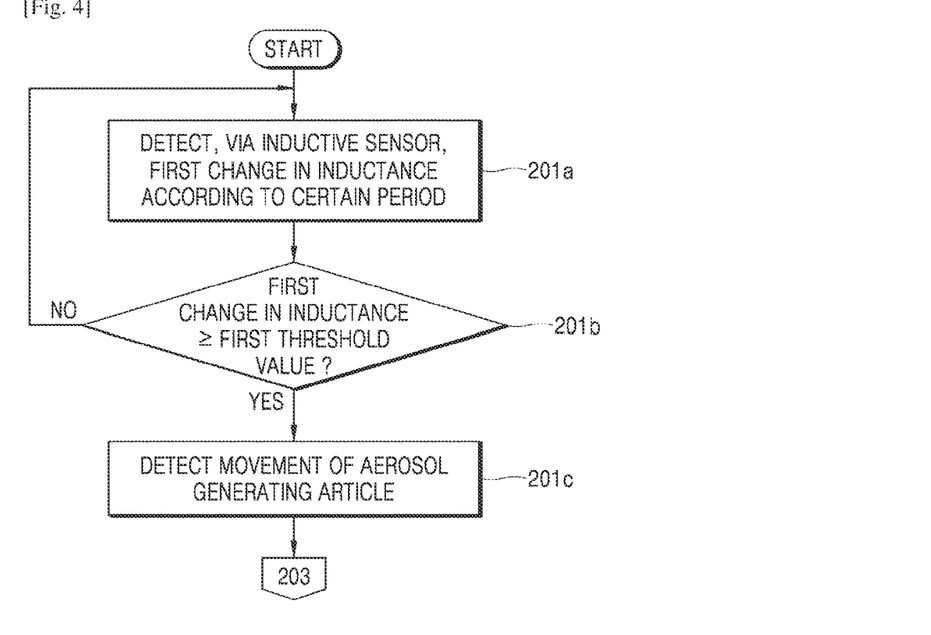
FIG. 4 illustrates a flowchart of determining whether an aerosol generating article is moved in an aerosol generating system, according to an embodiment.

FIG. 4 illustrates a flowchart of determining whether an aerosol generating article is moved in an aerosol generating system, according to an embodiment. FIG. 4 is a flowchart illustrating operation 201 of FIG. 2 in detail, and thus, the description of FIG. 4 corresponding to, same as, or similar to the above description will be omitted herein.

Referring to FIG. 4, in operation 201a, a processor (e.g., the processor 110 of FIG. 1) may periodically detect, via an inductive sensor (e.g., the inductive sensor 132 of FIG. 1), a first change in inductance according to a certain period. For example, the first change in inductance may refer to a smallest value of change in inductance at which the aerosol generating article 15 is determined to be moved.

In an embodiment, the processor 110 may switch a state of the inductive sensor 132 to an activation state and cut off power supplied to a heater (e.g., the heater 120 of FIG. 1), according to the certain period. Here, the certain period may include a sufficient period for which a change in inductance may be detected via the inductive sensor 132. For example, when the certain period is set to 1 second, the processor 110 may switch the state of the inductive sensor 132 to the activation state and cut off the power supplied to the heater 120, at intervals of 1 second.

In an embodiment, for the certain period, the processor 110 may switch the state of the inductive sensor 132 to the activation state, acquire data about a change in inductance, and switch the state of the inductive sensor 132 to an inactivation state. For example, when the certain period is set to 1 second, the processor 110 may switch the state of the inductive sensor 132 to the activation state, acquire data about a change in inductance for 0.7 seconds, switch the state of the inductive sensor 132 to the inactivation state, and maintain the inactivation state for 0.3 seconds.

According to an embodiment, in operation 201b, the processor 110 may determine whether a magnitude of the first change in inductance detected via the inductive sensor 132 is greater than or equal to a first threshold value. For example, the first threshold value may refer to a smallest value of an amount of change in inductance occurring as an aerosol generating article (e.g., the aerosol generating article 15 of FIG. 1) including a metal material is moved from an accommodation space of an aerosol generating apparatus (e.g., the aerosol generating apparatus 100 of FIG. 1).

In an embodiment, upon determining that the magnitude of the detected first change in inductance is greater than or equal to the first threshold value, in operation 201c, the processor 110 may detect that the aerosol generating article 15 is moved. In another embodiment, upon determining that the magnitude of the detected first change in inductance is less than the first threshold value, the processor 110 may return to operation 201a and perform the following operations again.

Figure 5:
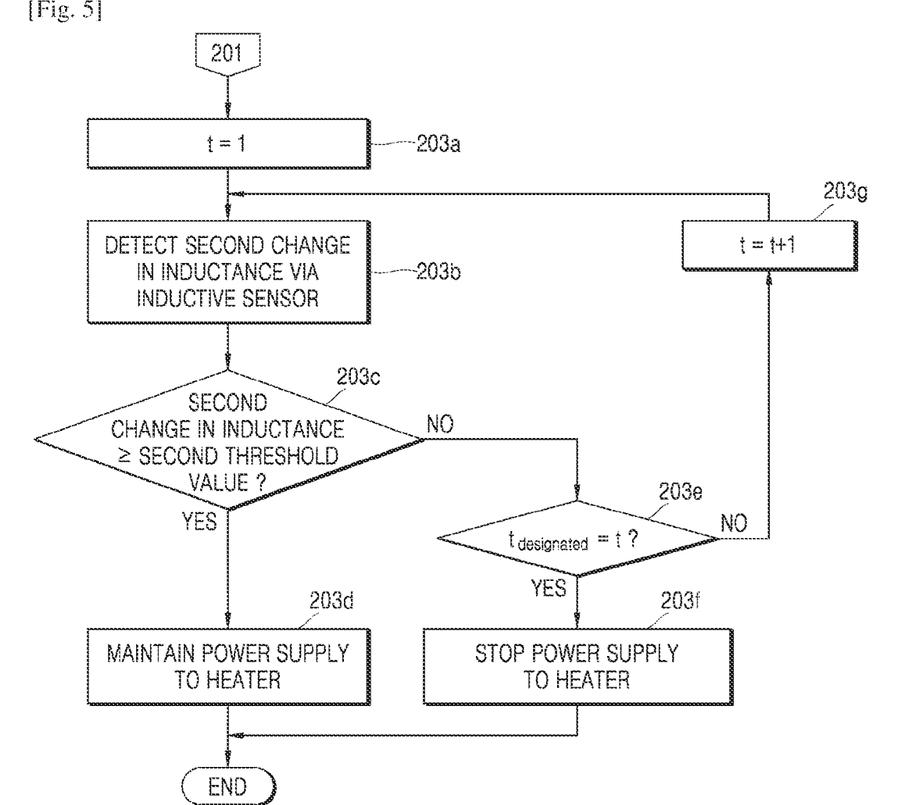
FIG. 5 illustrates a flowchart of controlling a power supply to a heater, based on whether an aerosol generating article is inserted therein, in an aerosol generating system according to an embodiment.

FIG. 5 illustrates a flowchart of controlling a power supply to a heater, based on whether an aerosol generating article is inserted therein, in an aerosol generating system according to an embodiment. FIG. 5 is a flowchart illustrating operation 203 of FIG. 2 in detail, and thus, the description of FIG. 5 corresponding to, same as, or similar to the above description will be omitted herein.

Referring to FIG. 5, in operation 203a, a processor (e.g., the processor 110 of FIG. 1) may set a detection time t of a change in inductance. For example, the detection time t may be set to 1. For example, the processor 110 may perform counting of a designated time (e.g., the designated time 300 of FIG. 3) by setting the detection time t of the change in inductance to 1.

According to an embodiment, in operation 203b, the processor 110 may detect a second change in inductance via an inductive sensor (e.g., the inductive sensor 132 of FIG. 1). For example, the second change in inductance may refer to a smallest value of change in inductance at which the aerosol generating article 15 is determined to be reinserted.

In an embodiment, the processor 110 may periodically switch a state of the inductive sensor 132 to an activation state and cut off power supplied to a heater (e.g., the heater 120 of FIG. 1), according to a certain period. Here, the certain period may include a sufficient period for which a change in inductance may be detected via the inductive sensor 132. For example, when the certain period is set to 1 second, the processor 110 may switch the state of the inductive sensor 132 to the activation state and cut off the power supplied to the heater 120, at intervals of 1 second.

In an embodiment, for the certain period, the processor 110 may switch the state of the inductive sensor 132 to the activation state, acquire data about a change in inductance, and switch the state of the inductive sensor 132 to an inactivation state. For example, when the certain period is set to 1 second, the processor 110 may switch the state of the inductive sensor 132 to the activation state, acquire data about a change in inductance for 0.7 seconds, switch the state of the inductive sensor 132 to the inactivation state, and maintain the inactivation state for 0.3 seconds.

According to an embodiment, in operation 203c, the processor 110 may determine whether a magnitude of the second change in inductance detected via the inductive sensor 132 is greater than or equal to a second threshold value. For example, the second threshold value may refer to a smallest value of an amount of change in inductance occurring as an aerosol generating article (e.g., the aerosol generating article 15 of FIG. 1) including a metal material is reinserted into an accommodation space of an aerosol generating apparatus (e.g., the aerosol generating apparatus 100 of FIG. 1).

In an embodiment, upon determining that the magnitude of the detected second change in inductance is greater than or equal to the second threshold value, in operation 203d, the processor 110 may maintain a power supply to the heater 120. For example, upon determining that the magnitude of the detected second change in inductance is greater than or equal to the second threshold value, the processor 110 may maintain a power supply from a battery to the heater 120.

In another embodiment, upon determining that the magnitude of the detected second change in inductance is less than the second threshold value, in operation 203e, the processor 110 may determine whether the detection time t of the change inductance is equal to a designated time $t_{designated}$.

In an embodiment, upon determining that the detection time t of the change in inductance is not equal to the designated time $t_{designated}$ in operation 203e, the processor 110 may update the detection time t of the change in inductance as t+1, in operation 203e. For example, when the detection time t of the change in inductance is 1 second (t=1) and the designated time $t_{designated}$ is 5 seconds ($T_{designated}$=5), the processor 110 may update the detection time t of the change in inductance as 2 seconds (t=2). Thereafter, the processor 110 may return to operation 203b and perform the following operations again.

In an embodiment, upon determining that the detection time t of the change in inductance is equal to the designated time $t_{designated}$, in operation 203f, the processor 110 may stop the power supply to the heater 120. For example, when the detection time t of the change in inductance is 5 seconds (t=5) and the designated time $t_{designated}$ is 5 seconds ($t_{designated}$=5), the processor 110 may cut off power supplied from the battery to the heater 120.

Figure 6A:
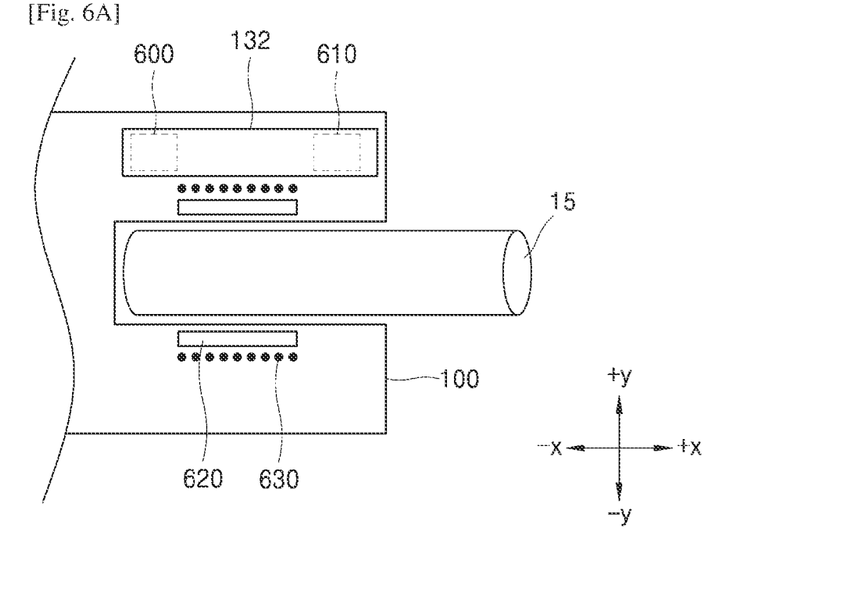
FIG. 6A is a view illustrating a method of controlling an inductive sensor of an aerosol generating apparatus when an aerosol generating article is in a first state, according to an embodiment.

FIG. 6A is a view illustrating a method of controlling an inductive sensor of an aerosol generating apparatus when an aerosol generating article is in a first state, according to an embodiment. The first state may refer to a state in which an aerosol generating article 15 is fully inserted into an accommodation space of an aerosol generating apparatus 100.

Referring to FIG. 6A, an aerosol generating system may include the aerosol generating apparatus 100 and the aerosol generating article 15. In an embodiment, the aerosol generating apparatus 100 may include the accommodation space into which the aerosol generating article 15 may be inserted.

In an embodiment, the aerosol generating apparatus 100 may include an inductive sensor 132, a susceptor 620, and an induction coil 630. In an embodiment, the induction coil 630 may generate a variable magnetic field as power is supplied from a battery, and the susceptor 620 may be heated via the variable magnetic field generated from the induction coil 630. For example, the induction coil 630 may be arranged to surround an outer circumferential surface of the susceptor 620.

In an embodiment, the inductive sensor 132 may include a first channel 600 and a second channel 610. For example, the first channel 600 may detect a change in inductance occurring due to a first portion of the aerosol generating article 15, and the second channel 610 may detect a change in inductance occurring due to a second portion of the aerosol generating article 15 that is distinguished from the first portion. In an embodiment, the first channel 600 and the second channel 610 may be arranged not to overlap the susceptor 620. For example, the first channel 600 may be arranged in a region provided to a lower portion of the susceptor 620 (e.g., a region provided in a −x direction), and the second channel 610 may be arranged in a region provided to an upper portion of the susceptor 620 (e.g., a region in a +x direction). As the first channel 600 and the second channel 610 are arranged not to overlap the susceptor 620, the first channel 600 and the second channel 610 may detect a change in inductance without being affected by the variable magnetic field generated from the induction coil 630.

Figure 6B:
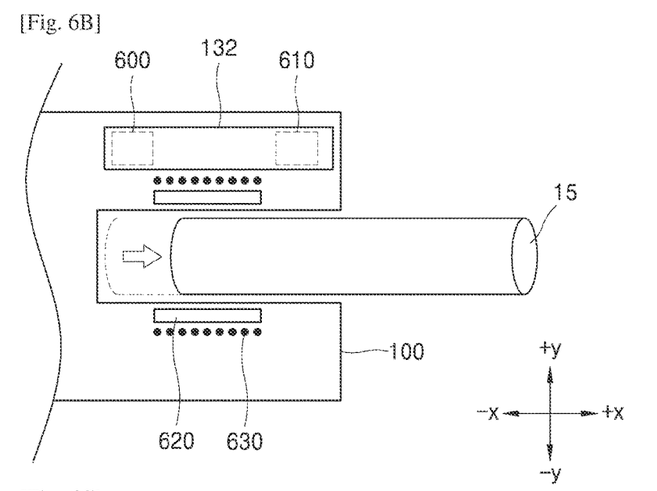
FIG. 6B is a view illustrating a method of controlling an inductive sensor of an aerosol generating apparatus when an aerosol generating article is in a second state, according to an embodiment.

FIG. 6B is a view illustrating a method of controlling an inductive sensor of an aerosol generating apparatus when an aerosol generating article is in a second state, according to an embodiment. The second state may refer to a state in which a portion of an aerosol generating article 15 is moved by a certain distance from an accommodation space of an aerosol generating apparatus 100.

Referring to FIG. 6B, when the aerosol generating article 15 moves in a +x direction from the accommodation space of the aerosol generating apparatus 100, a processor (e.g., the processor 110 of FIG. 1) may detect a change in inductance via some of a plurality of channels of an inductive sensor 132. For example, the processor 110 may detect the change in inductance via a first channel 600 of the inductive sensor 132. In an embodiment, when the change in inductance is detected via only some of the plurality of channels of the inductive sensor 132, the processor 110 may not start counting of a designated time. In another embodiment, the processor 110 may start counting of a designated time even when the change in inductance is detected via only some of the plurality of channels of the inductive sensor 132.

Figure 6C:
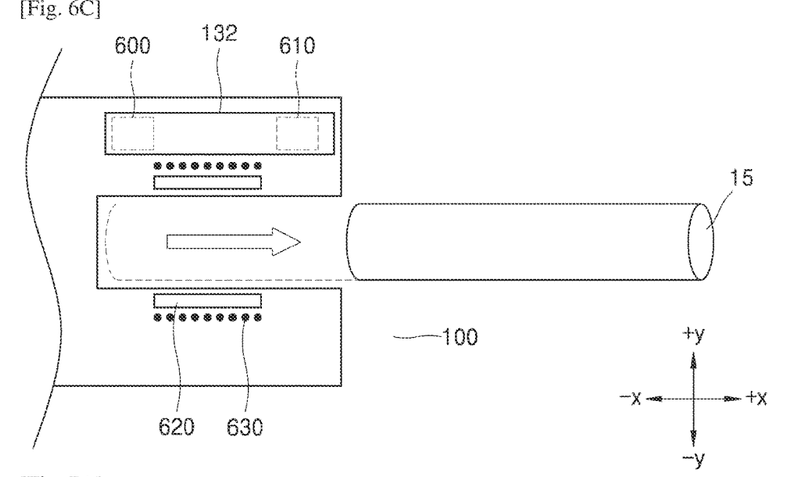
FIG. 6C is a view illustrating a method of controlling an inductive sensor of an aerosol generating apparatus when an aerosol generating article is in a third state, according to an embodiment.

FIG. 6C is a view illustrating a method of controlling an inductive sensor of an aerosol generating apparatus when an aerosol generating article is in a third state, according to an embodiment. The third state may refer to a state in which an aerosol generating article 15 is fully removed from an accommodation space of an aerosol generating apparatus 100.

Referring to FIG. 6C, when the aerosol generating article 15 is fully removed in a +x direction from the accommodation space of the aerosol generating apparatus 100, a processor (e.g., the processor 110 of FIG. 1) may detect a change in inductance via a plurality of channels of an inductive sensor 132. For example, the processor 110 may detect the change in inductance via a first channel 600 and a second channel 610 of the inductive sensor 132. In an embodiment, when the change in inductance is detected via the plurality of channels of the inductive sensor 132, the processor 110 may start counting of a designated time.

Figure 7A:
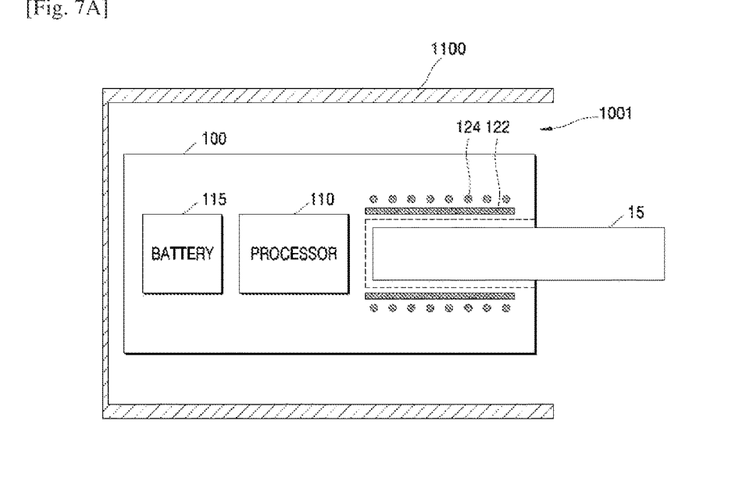
FIG. 7A is a diagram illustrating elements of an aerosol generating apparatus according to an embodiment.

FIG. 7A is a diagram illustrating elements of an aerosol generating apparatus according to an embodiment.

Referring to FIG. 7A, an aerosol generating apparatus 100 may include a susceptor 122, an induction coil 124, a battery 115, and a processor 110. However, the aerosol generating apparatus 100 is not limited thereto, and may further include other general-purpose elements, in addition to the elements shown in FIG. 7A.

The aerosol generating apparatus 100 may generate aerosol by heating an aerosol generating article 15 accommodated in the aerosol generating apparatus 100 in an induction heating method. The induction heating method may refer to a method of heating the susceptor 122 by applying an alternating magnetic field having a periodically changing direction to the susceptor 122 that generates heat by an external magnetic field.

When the alternating magnetic field is applied to the susceptor 122, energy loss may occur in the susceptor 122 due to eddy current loss and hysteresis loss, and the lost energy may be emitted from the susceptor 122 as heat energy. As an amplitude or frequency of the alternating magnetic field applied to the susceptor 122 increases, more heat energy may be emitted from the susceptor 122. The aerosol generating apparatus 100 may emit heat energy from the susceptor 122 by applying the alternating magnetic field to the susceptor 122, and may deliver, to the aerosol generating article 15, the heat energy emitted from the susceptor 122. In an embodiment, the susceptor 122 may be provided in the aerosol generating apparatus 100 in a shape such as a piece, a flake, or a strip.

At least a portion of the susceptor 122 may be formed of a ferromagnetic substance. For example, the susceptor 122 may include metal or carbon. The susceptor 122 may include at least one of ferrite, a ferromagnetic alloy, stainless steel, and aluminum (Al). Also, the susceptor 122 may include at least one of ceramic such as graphite, molybdenum, silicon carbide, niobium, a nickel alloy, a metal film, or zirconia, transition metal such as nickel (Ni) or cobalt (Co), and metalloid such as boron (B) or phosphorus (P).

The aerosol generating apparatus 100 may accommodate the aerosol generating article 15. The aerosol generating apparatus 100 may include a space, formed therein, for accommodating the aerosol generating article 15. The susceptor 122 may be arranged in or around the space for accommodating the aerosol generating article 15.

The susceptor 122 may surround at least a portion of an outer surface of the aerosol generating article 15 accommodated in the aerosol generating apparatus 100. For example, the susceptor 122 may surround a tobacco medium included in the aerosol generating article 15. Accordingly, heat may be more efficiently transferred from the susceptor 122 to the tobacco medium.

The induction coil 124 may be provided in the aerosol generating apparatus 100. The induction coil 124 may apply the alternating magnetic field to the susceptor 122. When power is supplied to the induction coil 124 from the aerosol generating apparatus 100, a magnetic field may be formed inside the induction coil 124. When an alternating current is applied to the induction coil 124, a direction of a magnetic field formed inside the induction coil 124 may be continuously changed. When the susceptor 122 is located inside the induction coil 124 and is exposed to the alternating magnetic field having the periodically changing direction, the susceptor 122 may generate heat, and the aerosol generating article 15 accommodated in an accommodation space of the aerosol generating apparatus 100 may be heated.

The induction coil 124 may be wound along an outer surface of the susceptor 122. In addition, the induction coil 124 may be wound along an inner surface of an outer housing of the aerosol generating apparatus 100. The susceptor 122 may be located in an inner space formed by winding the induction coil 124. When power is supplied to the induction coil 124, the alternating magnetic field generated by the induction coil 124 may be applied to the susceptor 122.

The induction coil 124 may extend in a longitudinal direction of the aerosol generating apparatus 100. The induction coil 124 may extend to an appropriate length in the longitudinal direction. For example, the induction coil 124 may extend to a length corresponding to a length of the susceptor 122, or may extend to a length that is longer than the length of the susceptor 122.

The induction coil 124 may be arranged at a position appropriate for applying the alternating magnetic field to the susceptor 122. For example, the induction coil 124 may be arranged at a position corresponding to the susceptor 122. The efficiency of applying the alternating magnetic field of the induction coil 124 to the susceptor 122 may be enhanced by the size and arrangement of the induction coil 124 as described above.

When an amplitude or frequency of the alternating magnetic field formed by the induction coil 124 is changed, the degree to which the susceptor 122 heats the aerosol generating article 15 may also be changed. The amplitude or frequency of the alternating magnetic field formed by the induction coil 124 may be changed by power applied to the induction coil 124, and thus, the aerosol generating apparatus 100 may control heating of the aerosol generating article 15 by adjusting the power applied to the induction coil 124. For example, the aerosol generating apparatus 100 may control an amplitude and frequency of an alternating current applied to the induction coil 124.

As an example, the induction coil 124 may be implemented as a solenoid. The induction coil 124 may be a solenoid wound along the inner surface of the outer housing of the aerosol generating apparatus 100, and the susceptor 122 and the aerosol generating article 15 may be located in an inner space of the solenoid. A material of a conductor included in the solenoid may be copper (Cu). However, the material of the conductor included in the solenoid is not limited thereto, and may include an alloy including any one or at least one of silver (Ag), gold (Au), aluminum (Al), tungsten (W), zinc (Zn), and nickel (Ni).

The battery 115 may supply power to the aerosol generating apparatus 100. The battery 115 may supply power to the induction coil 124. The battery 115 may include a battery for supplying a direct current to the aerosol generating apparatus 100 and a converter for converting the direct current supplied from the battery into an alternating current supplied to the induction coil 124.

The battery 115 may supply a direct current to the aerosol generating apparatus 100. The battery 115 may be a lithium iron phosphate (LiFePO4) battery, but is not limited thereto. For example, the battery 115 may be a lithium cobalt oxide (LiCo2) battery, a lithium titanate battery, a lithium polymer (LiPoly) battery, or the like.

The converter may include a low-pass filter that performs filtering on the direct current supplied from the battery and outputs the alternating current supplied to the induction coil 124. The converter may further include an amplifier for amplifying the direct current supplied from the battery. For example, the convener may be implemented via a low-pass filter included in a load network of a class-D amplifier.

The processor 110 may control power supplied to the induction coil 124. The processor 110 may control the battery 115 such that the power supplied to the induction coil 124 is adjusted. For example, the processor 110 may perform control for constantly maintaining a temperature at which the susceptor 122 heats the aerosol generating article 15, based on a temperature of the susceptor 122.

Figure 7B:
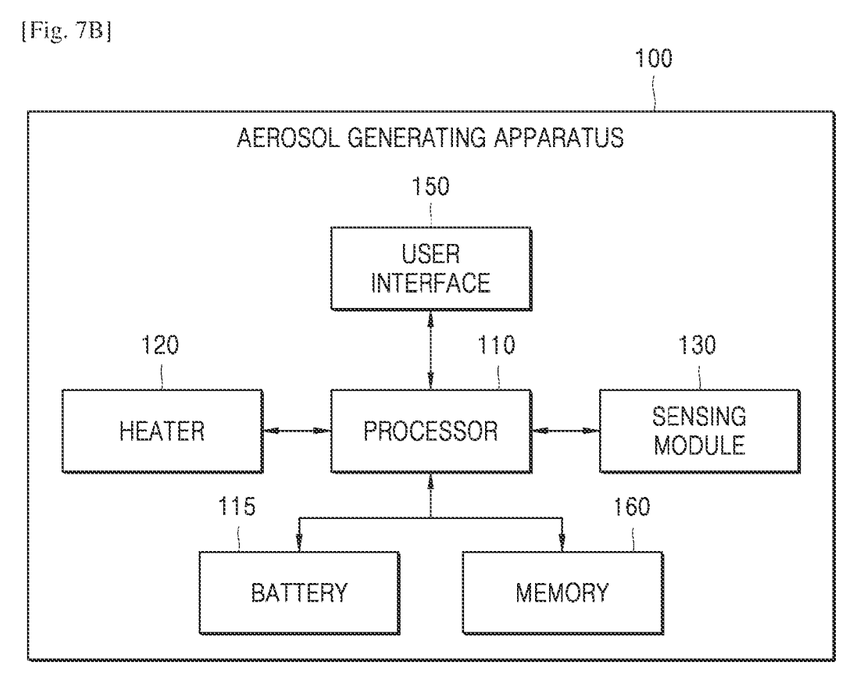
FIG. 7B illustrates a block diagram of an aerosol generating apparatus according to an embodiment.

FIG. 7B is a block diagram illustrating components of the aerosol generating device according to an embodiment.

Referring to FIG. 7B, the aerosol generating device 100 may include a battery 115, a heater 120, a sensing module 130, a user interface 150, a memory 160 and a processor 110. However, the internal structure of the aerosol generating device 100 is not limited to the structures illustrated in FIG. 7B. According to the design of the aerosol generating device 100, it will be understood by one of ordinary skill in the art that some of the components shown in FIG. 7B may be omitted or new components may be added.

The battery 115 supplies power to be used for the aerosol generating device 100 to operate. The battery 115 may supply power such that the heater 120 may be heated. In addition, the battery 115 may supply power required for operation of other components included in the aerosol generating device 100, that is, the sensing module 130, the user interface 150, the memory 160, and the processor 110. The battery 115 may be a rechargeable battery or a disposable battery.

In an embodiment, the heater 120 may include a susceptor (e.g., the susceptor 122 of FIG. 7A) and an induction coil (e.g., the induction coil 124 of FIG. 7A). For example, when the heater 120 of the aerosol generating apparatus 100 is an induction heating type, the processor 110 may generate an alternating magnetic field by applying an alternating current to the induction coil 124. As the alternating magnetic field generated by the induction coil 124 is applied to the susceptor 122, the susceptor 122 may be heated and heat an aerosol generating article (e.g., the aerosol generating article 15 of FIG. 7A).

The aerosol generating device 100 may include a sensing module 130. A result sensed by the sensing module 130 is transmitted to the processor 110, and the processor 110 may control the aerosol generating device 100 to perform various functions such as controlling the operation of the heater 120, restricting smoking, displaying a notification, and the like.

The sensing module 130 may include a puff sensor. The puff sensor may detect a user's puff based on any one of a temperature change, a flow change, a voltage change, and a pressure change.

In addition, the sensing module 130 may include a temperature sensor for measuring a temperature of the heater 120 (or the aerosol generating article 15). The aerosol generating apparatus 100 may include a temperature sensor for measuring a temperature of the heater 120, or instead of a separate temperature sensor being included, the heater 120 may operate as a temperature sensor. Alternatively, while the heater 120 operates as the temperature sensor, the aerosol generating apparatus 100 may further include a separate temperature sensor.

In addition, the sensing module 130 may include a temperature sensor for measuring an ambient temperature of the aerosol generating apparatus 100. The ambient temperature is a temperature outside the aerosol generating apparatus 100. The ambient temperature is an atmospheric temperature at which aerosol generated from the aerosol generating article 15 in the aerosol generating apparatus 100 is emitted. The temperature sensor may be arranged outside a housing of the aerosol generating apparatus 100 to measure the ambient temperature, or may be arranged on a path through which external air is introduced. The temperature sensor may transmit a value of the measured ambient temperature to the processor 110, and the processor 110 may determine a heating profile for heating the aerosol generating article 15, based on the ambient temperature.

In addition, the sensing module 130 may include a humidity sensor. The humidity sensor may measure ambient humidity of the aerosol generating apparatus 100. The ambient humidity is humidity outside the aerosol generating apparatus 100. The ambient humidity is atmospheric humidity at which aerosol generated from the aerosol generating article 15 in the aerosol generating apparatus 100 is emitted. The humidity sensor may be arranged outside the housing to measure the ambient humidity, or may be arranged on the path through which the external air is introduced. The humidity sensor may transmit a value of the measured ambient humidity to the processor 110, and the processor 110 may determine a heating profile for heating the aerosol generating article 15, based on the ambient humidity.

In addition, the sensing module 130 may include an inductive sensor. The inductive sensor may detect whether the aerosol generating article 15 is inserted into the aerosol generating apparatus 100. In an example, the aerosol generating article 15 may include a metal material such as aluminum, and the inductive sensor may detect a change in inductance occurring as the aerosol generating article 15 is inserted into the aerosol generating apparatus 100.

In an embodiment, the processor 110 may detect whether the aerosol generating article 15 is moved from an accommodation space, via the sensing module 130 including at least one of the inductive sensor and the temperature sensor. For example, the processor 110 may detect whether the aerosol generating article 15 while being inserted into the accommodation space is moved, based on the change in inductance detected via the inductive sensor. For another example, the processor 110 may detect whether the aerosol generating article 15 while being inserted into the accommodation space is moved, based on a change in temperature detected via the temperature sensor. In an embodiment, when the movement of the aerosol generating article 15 is detected, the processor 110 may control a power supply to the heater 120 by detecting a reinsertion of the aerosol generating article 15 for a designated time.

When the insertion of the aerosol generating article 15 is detected, the processor 110 may control the aerosol generating apparatus 100 such that heating automatically starts even without an additional external input. For example, when the insertion of the aerosol generating article 15 is detected, the processor 110 may control the battery 115 to supply power to the induction coil 124. However, the processor 110 is not limited thereto, and may control the aerosol generating apparatus 100 such that heating starts only when an additional external input is provided.

The user interface 150 may provide the user with information about the state of the aerosol generating device 100. The user interface 150 may include various interfacing devices, such as a display or a light emitter for outputting visual information, a motor for outputting haptic information, a speaker for outputting sound information, input/output (I/O) interfacing devices (e.g., a button or a touch screen) for receiving information input from the user or outputting information to the user, terminals for performing data communication or receiving charging power, and communication interfacing modules for performing wireless communication (e.g., Wi-Fi, Wi-Fi direct, Bluetooth, near-field communication (NFC), etc.) with external devices.

However, the aerosol generating device 100 may be implemented by selecting only some of the above-described examples of various user interface 150.

The user interface 150 may include the display for outputting the visual information related to the aerosol generating apparatus 100. Here, the visual information related to the aerosol generating apparatus 100 includes all information related to operation of the aerosol generating apparatus 100. For example, the display may output the information about the state of the aerosol generating apparatus 100 (e.g., whether the aerosol generating apparatus 100 may be used, and the like), information about the heater 120 (e.g., preheat start, preheat progress, preheat completion, and the like), information related to the battery 115 (e.g., the remaining capacity of the battery 115, whether the battery 115 may be used, and the like), information related to reset of the aerosol generating apparatus 100 (e.g., reset timing, reset progress, reset completion, and the like), information related to cleaning of the aerosol generating apparatus 100 (e.g., cleaning timing, cleaning needed, cleaning progress, cleaning completion, and the like), information related to charging of the aerosol generating apparatus 100 (e.g., charging needed, charging progress, charging completion, and the like), information related to puffs (e.g., the number of puffs, a notice of puff end, and the like), safety-related information (e.g., elapse of use time, and the like), or the like.

The communication interface may be communicatively connected to an external device, an external server, and the like. For example, the communication interface may be implemented as a type that supports at least one communication method from among various types of digital interfaces, AP-based Wi-Fi (e.g., WiFi, wireless local area network (LAN), or the like), Bluetooth, Zigbee, wired/wireless LAN, WAN, Ethernet, IEEE 1394, HDMI, USB, MHL, AES/EBU, Optical. Coaxial, and the like. Also, the communication interface may include a transition minimized differential signaling (TMDS) channel for transmitting video and audio signals, a display data channel (DDC) for transmitting and receiving device information and video- or audio-related information (e.g., enhanced extended display identification data (E-EDID)), and a consumer electronic control (CEC) channel for transmitting and receiving a control signal. However, the communication interface is not limited thereto, and may be implemented as various types of interfaces.

The memory 160, as a hardware component configured to store various pieces of data processed in the aerosol generating device 100, may store data processed or to be processed by the processor 110. The memory 160 may include various types of memories; random access memory (RAM), such as dynamic random access memory (DRAM) and static random access memory (SRAM), etc.; read-only memory (ROM); electrically erasable programmable read-only memory (EEPROM), etc.

The memory 160 may store an operation time of the aerosol generating device 100, the maximum number of puffs, the current number of puffs, at least one temperature profile, data on a user's smoking pattern, etc.

The processor 110 may generally control operations of the aerosol generating device 100. The processor 110 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

Meanwhile, as shown in FIG. 7A, the aerosol generating apparatus 100 may be included in an aerosol generating system together with a separate cradle 1100. For example, the cradle 1100 may be used to charge the battery 115 of the aerosol generating apparatus 100. For example, while being accommodated in an accommodation space 1001 inside the cradle 1100, the aerosol generating apparatus 100 may be supplied with power from a battery of the cradle 1100 and charge the battery 115 of the aerosol generating apparatus 100

One embodiment may also be implemented in the form of a recording medium including instructions executable by a computer, such as a program module executable by the computer. The computer-readable recording medium may be any available medium that can be accessed by a computer, including both volatile and nonvolatile media, and both removable and non-removable media. In addition, the computer-readable recording medium may include both a computer storage medium and a communication medium. The computer storage medium includes all of volatile and non-volatile media, and removable and non-removable media implemented by any method or technology for storage of information such as computer-readable instructions, data structures, program modules, or other data. The communication medium typically includes computer-readable instructions, data structures, other data in modulated data signals such as program modules, or other transmission mechanisms, and includes any information transfer media.

The descriptions of the above-described embodiments are merely examples, and it will be understood by one of ordinary skill in the art that various changes and equivalents thereof may be made. Therefore, the scope of the disclosure should be defined by the appended claims, and all differences within the scope equivalent to those described in the claims will be construed as being included in the scope of protection defined by the claims.

The invention claimed is:

1. An aerosol generating system comprising:
an aerosol generating device including formed therein a first accommodation space having an aerosol generating article inserted therein;
a cradle including formed therein a second accommodation space having the aerosol generating device accommodated therein, wherein the aerosol generating device includes: a battery charged by power received from the cradle while the aerosol generating device is accommodated in the second accommodation space;
an induction coil configured to form a magnetic field within the first accommodation space by receiving power from the battery; and
a controller electrically connected to the induction coil, wherein the controller is configured to:
when the aerosol generating article is inserted into the first accommodation space, heat the aerosol generating article by controlling the induction coil to form the magnetic field;
when the aerosol generating article is moved or removed from the first accommodation space, stop supply of power to the induction coil after a certain time elapses; and when the aerosol generating article is inserted again after moved or removed from the first accommodation space, not stop the supply of power to the induction coil.

2. The aerosol generating system of claim 1, wherein the certain time includes a time within a range of about 1 second to 5 seconds.

3. The aerosol generating system of claim 1, wherein the controller switches a mode for detecting reinsertion of the aerosol generating article for the certain time into an active state.

4. The aerosol generating system of claim 1, wherein the aerosol generating device further includes a puff sensor arranged on a path via which external air is introduced, and electrically connected to the controller, wherein the controller detects an inhalation of a user on the basis of at least one of a change in temperature, a change in flow rate, and a change in pressure, on the path.

5. The aerosol generating system of claim 1, wherein the induction coil includes a solenoid wound along the first accommodation space, and the induction coil includes at least one of copper, silver, gold, aluminum, tungsten, zinc, and nickel.

* * * * *